United States Patent [19]

Uchida et al.

[11] Patent Number: 4,924,394
[45] Date of Patent: May 8, 1990

[54] ANTI-SKID BRAKING SYSTEM FOR AUTOMOTIVE VEHICLE

[75] Inventors: Kiyoyuki Uchida, Susono; Hideo Inoue, Kanagawa; Tatsuo Sugitani, Mishima, all of Japan

[73] Assignee: Toyota Jidosha Kabushiki Kaisha, Toyota, Japan

[21] Appl. No.: 372,138

[22] Filed: Jun. 26, 1989

Related U.S. Application Data

[63] Continuation of Ser. No. 99,239, Sep. 21, 1987, abandoned.

[30] Foreign Application Priority Data

Sep. 20, 1986 [JP] Japan .................. 61-222749

[51] Int. Cl.$^5$ .................. B60T 8/68; B60T 8/58; B60T 8/74
[52] U.S. Cl. .................. 364/426.02; 364/426.01; 303/95; 303/100; 303/108; 303/110; 361/238
[58] Field of Search .................. 364/426.02, 426.01; 361/238; 303/95, 100, 108, 110

[56] References Cited

U.S. PATENT DOCUMENTS

| | | | |
|---|---|---|---|
| 3,934,938 | 1/1976 | Kuwana et al. | 303/109 |
| 4,033,634 | 7/1977 | Arai et al. | 303/110 |
| 4,090,741 | 5/1978 | Rajput | 303/105 |
| 4,384,330 | 5/1983 | Matsuda et al. | 364/426 |
| 4,439,832 | 3/1984 | Sato et al. | 364/426.02 |
| 4,729,608 | 3/1988 | Fennel et al. | 364/426 |
| 4,748,564 | 5/1988 | Matsuda | 364/426 |
| 4,763,960 | 8/1988 | Uchida et al. | 303/97 |

FOREIGN PATENT DOCUMENTS

58-26661  2/1983  Japan .

Primary Examiner—Felix D. Gruber
Assistant Examiner—V. N. Trans
Attorney, Agent, or Firm—Oblon, Spivak, McClelland, Maier & Neustadt

[57] ABSTRACT

An anti-skid braking system for a vehicle, having (a) hydraulic brakes for wheels of the vehicle, (b) actuators provided for respective brake groups each including at least one of the brakes, for controlling a braking pressure or pressures of the brake or brakes of the corresponding groups, (c) speed sensors, at least one of which is provided corresponding to each actuator, for detecting speeds of the wheels, and (d) to controller operable for: normally presuming that an actual speed of the vehicle is represented by a highest one of the detected wheel speeds; after a deceleration value of the highest speed has exceeded a preset upper limit, fixing the deceleration value of the vehicle at the preset upper limit, and presuming the actual vehicle speed based on the upper limit; and calculating a slip amount of each wheel based on a difference between the presumed vehicle speed and the detected wheel speed, to control each actuator so as to prevent the wheel from skidding. The system includes a detector generating a signal whose level is changed in at least two steps indicative of at least two values of an actual deceleration value of the vehicle. The system further includes a setting device for determining the upper limit of the deceleration value such that the upper limit is changed with the detected actual deceleration value.

9 Claims, 8 Drawing Sheets

ANTI-SKID BRAKING SYSTEM FOR AUTOMOTIVE VEHICLE

This application is a continuation of application Ser. No. 07/099,239 filed on Sept. 21, 1987 now abandoned.

BACKGROUND OF THE INVENTION

1. Field of the Invention

The present invention relates to an anti-skid braking system for motor vehicles, adapted to apply brake to the vehicle, while preventing the wheels from skidding or locking on the road surface.

2. Discussion of the Prior Art

An anti-skid braking system is employed for an automotive vehicle, for braking the vehicle with a minimum braking distance, and without deteriorating the straight-line running stability of the vehicle. Usually, this type of braking system includes hydraulically operated wheel brakes for restraining a rotating movement of the vehicle wheels, actuators for regulating the brake fluid pressures applied to the wheel brakes, speed sensors for detecting the rotating speeds of the wheels, and a controller for presuming amounts of slip of the wheels based on the speeds detected by the speed sensors, and controlling the actuators. Generally, the controller operates to presume that an actual running speed of the vehicle is represented by the highest one of the speeds of the wheels. After the deceleration rate (i.e., deceleration value) of the highest speed has exceeded a preset upper limit, the controller fixes the deceleration of the vehicle at the preset upper limit, presumes the actual vehicle speed based on the upper limit, and calculates a slip amount of each wheel based on a difference between the presumed vehicle speed and the detected speed of the wheel.

While it is possible that the deceleration rate of the vehicle is fixed at an upper limit which is considered a maximum rate for the specific vehicle, the upper limit is actually reduced as the coefficient of friction of the road surface is lowered. As one solution to deal with this matter, laid-open Publication No. 58-26661 (published on Feb. 17, 1983) of Japanese Patent Application proposes to change the upper limit of the vehicle deceleration rate, depending upon the specific actual braking conditions. Described more particularly, when the deceleration rate of a highest one of the speeds of a plurality of wheels has exceeded a preset upper limit, the highest speed at that moment is stored in a memory. Subsequently, the speed of any one of the partly slipping wheels comes up to a peak level due to a decrease in the braking pressure applied to that wheel. The deceleration rate of the vehicle at this point of time is presumed based on a gradient of a straight line which connects the speed level stored in the memory, and the recovered peak level at the above-indicated point of time. When it later becomes necessary to fix the deceleration rate at an upper limit, the previously presumed deceleration rate is used as the upper limit. The proposed arrangement permits more accurate presumption of the actual running speed of the vehicle, for improved adequacy of controlling the anti-skid braking system.

According to the above proposed arrangement, each decleration rate presumed based on the gradient obtained in the manner described above is used as the upper limit, only at a later time when the deceleration rate of a highest one of the speeds of the wheels will exceed the upper limit in the next cycle of control. Namely, the presumed upper limit obtained in the preceding cycle is used when the current cycle indicates the necessity of fixing the deceleration rate at a suitable upper limit. Therefore, in the first cycle of control, an upper limit of the deceleration rate has not yet been presumed. This means that the proposed arrangement must employ as an upper limit in the first control cycle, a maximum deceleration rate that is considered to occur on a specific vehicle, as in the conventional arrangement. Consequently, the presumed running speed of the vehicle may considerably deviate from the actual running speed, if the employed maximum deceleration rate is excessively different from the actual rate, since the employed maximum rate is not based on such an extraordinary low friction coefficient of the road surface. Thus, the accuracy of control of the proposed anti-skid braking system is accordingly deteriorated. This is a problem remaining in the proposed conventional system.

SUMMARY OF THE INVENTION

It is therefore an object of the present invention to provide an anti-skid braking system which is capable of controlling the braking pressures applied to the wheel brakes, depending upon a specific coefficient of friction of the road surface, even in the first control cycle of determining an upper limit of the deceleration rate of the vehicle, and presuming the vehicle speed based on the determined upper limit, for the first time.

The above object may be attained according to the principle of the present invention, which provides an anti-skid braking system for an automotive vehicle, having (a) a plurality of hydraulically operated brakes provided for a plurality of wheels of the vehicle, (b) a plurality of actuators provided for a corresponding plurality of groups of brakes each group including at least one of the plurality of brakes, each of the actuators being operable for controlling a braking pressure or pressures of the at least one brake of the corresponding group, (c) a plurality of speed sensors, at least one of which is provided corresponding to each of the plurality of actuators, for detecting rotating speeds of the wheels, and (d) a controller operable for: normally presuming that an actual running speed of the vehicle is represented by a highest one of the speeds of the wheels detected by the speed sensors; after a deceleration rate of the highest speed wheel has exceeded a preset upper limit, fixing the deceleration rate of the vehicle at the preset upper limit, and presuming the actual running speed of the vehicle, based on the upper limit; and calculating an amount of slip of each of the wheels based on a difference between the presumed running speed of the vehicle and the detected speed of each wheel, to control each of the actuators so as to prevent at least one of the wheels which corresponds to the each actuator, from skidding on a road surface, the braking system comprising: a detecting device attached to a body of the vehicle, for detecting an actual deceleration rate of the body, the detecting device generating an electric signal whose level is changed in at least two steps representative of at least two different values of the deceleration rate of the body; and upper-limit setting means for determining the upper limit of the deceleration rate of the vehicle such that the upper limit is changed with the actual deceleration rate of the body detected by the detecting device.

In the anti-skid braking system of the present invention constructed as described above, the upper-limit setting means is adapted to repeatedly execute, during brake application, a control cycle of determining an upper limit of the deceleration rate of the presumed running speed of the vehicle, based on the deceleration rate of the vehicle which is actually detected by the detecting device. After the deceleration rate of the highest one of the speeds of the wheels has reached the preset upper limit, the controller fixes the deceleration rate of the vehicle at the upper limit determined by the upper-limit setting means, and presumes the actual running speed of the vehicle based on the determined upper limit. Since the deceleration rate of the vehicle at the moment when the deceleration rate of the highest speed of the wheels exceeds the preset upper limit increases with an increase in the coefficient of friction of the road surface, the determination of the upper limit based on the actually detected deceleration rate assures that the determined upper limit is suitably changed with a variation of the road surface. This is contrary to the conventional arrangement proposed in the Publication identified above, in which the deceleration rate is fixed at an upper limit determined in the preceding control cycle. In the instant arrangement according to the invention, the deceleration rate is fixed at the upper limit set by the upper-limit setting means, when it becomes necessary to do so. In other words, the upper limit can be determined depending upon the current friction coefficient of the road surface, even in the first control cycle. Therefore, the instant arrangement permits improved accuracy of presumption of the actual speed of the vehicle, and consequent improvement in the adequacy of control of the anti-skid braking system.

According to one feature of the invention, the upper-limit setting means includes memory means for storing the electric signal which is generated when an amount of slip of each of the wheels except the wheel which has the highest speed exceeds a predetermined value. The upper-limit setting means determines the upper limit based on the electric signal currently stored in the memory means.

According to another feature of the invention, the braking system further comprises time setting means for determining a pressure-reducing time during which the controller keeps applying a pressure-reducing signal to each actuator, such that the pressure-reducing time is shortened as the actual deceleration rate of the vehicle detected by the detecting device is increased. This arrangement permits more improved adequacy of the anti-skid control, since the length of time for lowering the braking pressure to obviate an excessive amount of slip of the wheel is determined or varied depending upon the level of the braking pressure at the moment when the pressure-reducing signal is generated. Stated in more detail, the time necessary to reduce the braking pressure by a given amount is reduced with an increase in the level of the pressure from which the pressure reduction starts. Since the deceleration rate of the vehicle is relatively high when the braking pressure is relatively high, the pressure-reducing time may be properly set such that the time is shortened as the deceleration rate actually detected by the detecting device is increased.

In one form of the above feature of the invention, the time setting means includes a pressure-reducing-time table for storing a relationship in which a plurality of time values of the pressure-reducing time correspond to a plurality of successive ranges of the actual deceleration rate detected by the detecting device. In this case, the time setting means retrieves from the pressure-reducing-time table one of the plurality of time values which corresponds to one of the successive ranges in which the actual deceleration rate detected by the detecting device falls.

According to a further feature of the invention, the detecting device includes a detecting head which comprises: a base fixed to the body of the vehicle; a planar member secured at one end thereof to the base such that a free end portion of the planar member protrudes from the base, and such that major opposite surfaces of the planar member face in opposite front and rear directions of the vehicle; a weight secured to the free end portion of the planar member; and detecting means for detecting an elastic strain of the planar member which occurs due to an inertia of the weight upon deceleration of the vehicle. In this case, the planar member may consist of a silicon wafer, and the detecting means may consist of a diffusion resistor formed on a surface of the silicon wafer.

According to a still further feature of the invention, the detecting device includes a detecting head which comprises a pendulum pivotally supported about an axis extending in a transverse direction of the vehicle, and detecting means for detecting an amount of a pivoting motion of the pendulum due to an inertia of the pendulum upon deceleration of the vehicle.

In one form of the above feature of the invention, the detecting means includes a pivoting plate which is pivoted with the pendulum. The pivoting plate has a plurality of apertures formed through a thickness thereof, on a circle having a center on an axis of pivot thereof. The detecting means further includes a photoelectric sensor adapted to detect passage of the apertures.

In accordance with a yet further feature of the invention, the upper-limit setting means includes an upper-limit table for storing a relationship in which a plurality of upper-limit values of the upper limit correspond to a plurality of successive ranges of the actual deceleration rate detected by the detecting device. The upper-limit setting means retrieves from the upper-limit table table one of the plurality of upper-limit values which corresponds to one of the successive ranges in which the actual deceleration rate detected by the detecting device falls.

The vehicle on which the instant braking system is provided may be a four-wheel drive vehicle having four wheels all of which are driven by an engine.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which.

DETAILED DESCRIPTION OF THE PREFERRED EMBODIMENTS

Figure 1:
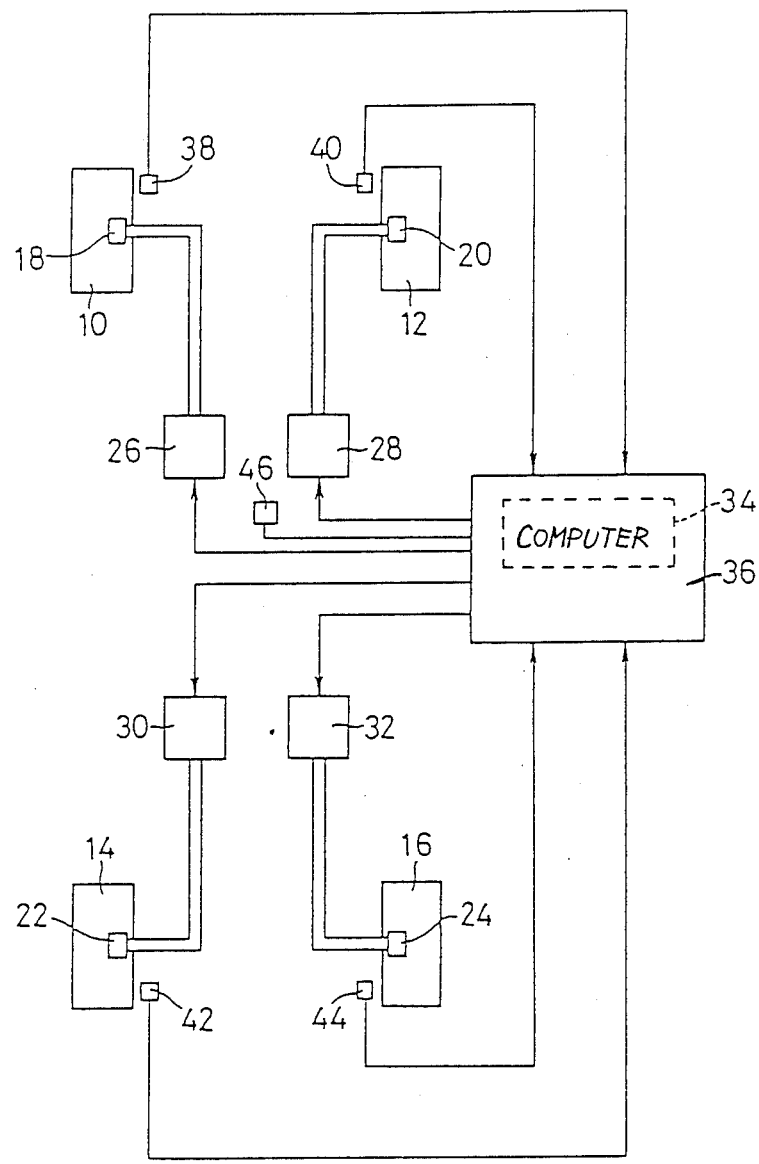
FIG. 1 is a diagrammatic view showing one embodiment of an anti-skid braking system of the present invention for an automotive vehicle.

Referring to the diagrammatic view of FIG. 1, there is shown the presently preferred embodiment of an anti-skid braking system of the present invention for a four-wheel drive vehicle. In the figure, reference numerals 10, 12, 14 and 16 designate a left-front wheel, a right-front wheel, a left-rear wheel and a right-rear wheel, respectively. These wheels 10, 12, 14 and 16 are provided with respective hydraulically operated wheel brakes 18, 20, 22 and 24. The pressures of brake fluid in these brakes 18, 20, 22, 24 are regulated, or increased or decreased by respective actuators 26, 28, 30 and 32, which are controlled by a control device 36 whose major portion is constituted by a computer 34. To this controller 36, there are connected speed sensors 38, 40, 42 and 44, and a vehicle-deceleration detecting device 46.

Figure 2:
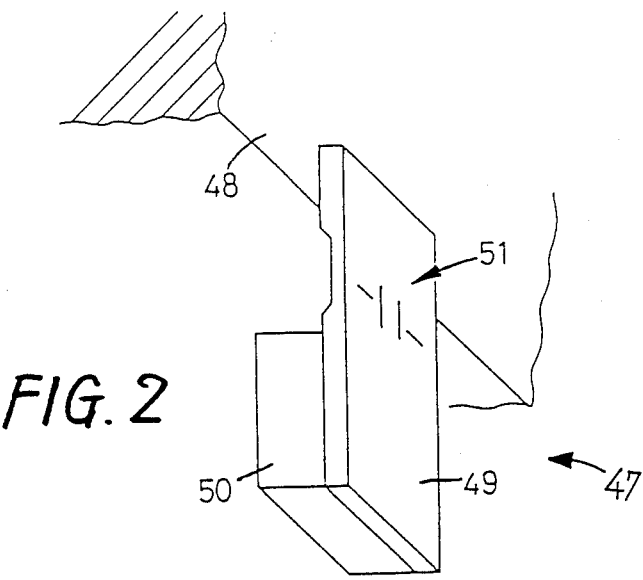
FIG. 2 is a schematic perspective view schematically showing a detecting head of a vehicle-deceleration detecting device used in the braking system of FIG. 1.
Figure 3:
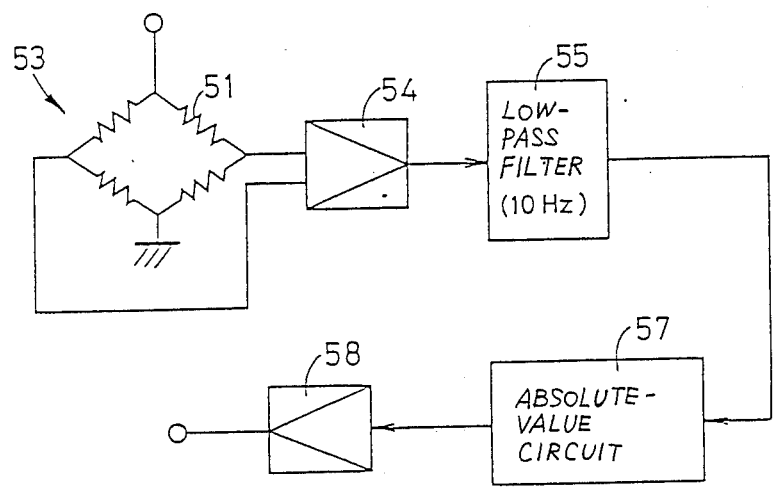
FIG. 3 is a block diagram illustrating a processing circuit of the vehicle-deceleration detecting device.

The detecting device 46 includes a detecting head 47 shown in FIG. 2, and a processing circuit shown in FIG. 3. The detecting head 47 has a base 48 fixed to the body of the vehicle, and a silicon wafer 49 secured at its one end to the base 48, such that the other or free end projects from the base 48. The silicon wafer 49 is oriented such that its major opposite surfaces face in the opposite front and rear directions of the vehicle. The silicon wafer 49 carries at its free end a weight 50 fixed thereto, and has a diffusion resistor 51 formed on a part of its surface adjacent to the fixed end. The detecting head is adapted such that the silicon wafer 49 is deformed or flexed due to an inertia of the weight 50, when the vehicle is accelerated or decelerated. As a result, the resistance of the diffusion resistor 51 is changed. The processing circuit includes a bridge 53 having the diffusion resistor 51 as one of its four arms, and further includes an amplifier 54, a low-pass filter 54, an absolute-value circuit 57 and an amplifier 58, for processing output voltages of the bridge 51. The amplifier 58 provides an output voltage which is proportional to a rate of acceleration or deceleration of the vehicle.

Figure 4:
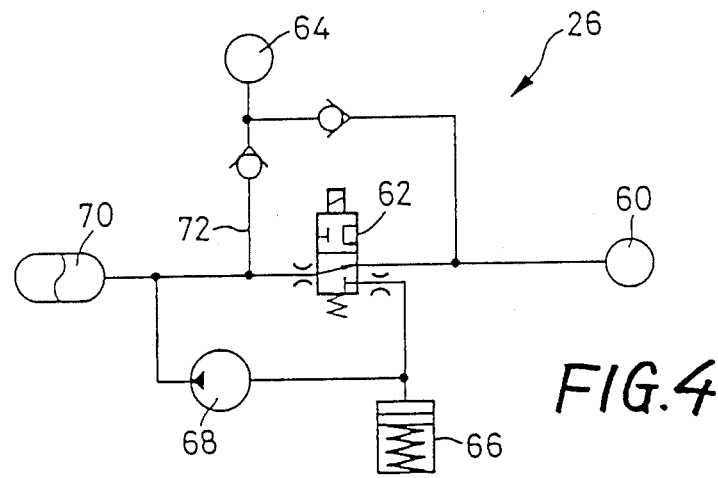
FIG. 4 is a diagrammatic view illustrating details of a hydraulic circuit of one type of actuator used in the braking system of FIG. 1.
Figure 5:
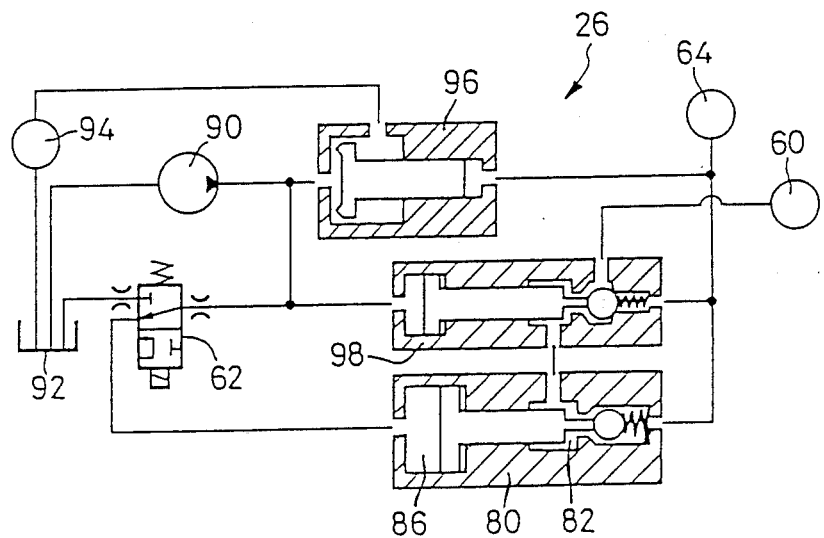
FIG. 5 is a diagrammatic view illustrating a hydraulic circuit of another type of actuator used in place of the actuator of FIG. 4.

The actuator 26 may be of either a "closed-circuit" type as shown in FIG. 4, or a "variable-volume" type as shown in FIG. 5. The other actuators 28, 30 and 32 are identical with the actuator 26 as shown in FIG. 4 or 5. However, it is possible that some of the elements as shown in FIG. 4 or 5 are commonly used for all of the four actuators 26, 28, 30, 32.

The actuator 26 of the "closed-circuit" type of FIG. 4 is adapted such that a wheel brake cylinder 60 for activating the brake 18 is brought into communication with a master cylinder 64 or a reservoir 66, selectively, by a solenoid-operated directional control valve 62. The pressure in the wheel brake cylinder 60 is increased as the pressurized brake fluid is fed from the master cylinder 64 into the brake cylinder 60, and is decreased as the brake fluid is discharged from the brake cylinder 60 into the reservoir 66. The brake fluid in the reservoir 66 is pumped by a pump 68, and is stored in an accumulator 70. The fluid in the accumulator 70 is returned as needed, to a main fluid passage 72 which connects the master cylinder 64 and the brake cylinder 60. This is the reason why the actuator of FIG. 4 is called the "closed-circuit" type.

On the other hand, the actuator 26 of the "variable-volume" type of FIG. 5 is adapted such that the pressure of the brake fluid in the brake cylinder 60 is regulated by changing the volume of a brake-pressure chamber 82 in a regulator 80. The regulator 80 has a pressure chamber 86 which is brought into communication with a pump 90 or a reservoir 92, selectively, by the solenoid-operated directional control valve 62. The pressure in the brake-pressure chamber 82, that is, the pressure in the brake cylinder 60 is increased or decreased by controlling the pressure in the pressure chamber 86. In this type of actuator, the pump 90 is used primarily for operating a power steering device 94 of the vehicle. The actuator 26 has a regulator 96 which is normally placed in a position in which the pressurized fluid generated by the pump 90 is allowed to freely flow through the regulator 96 to the power steering device 94. The fluid of the pressure proportional to the pressure in the master cylinder 64 is delivered from the pump 90 to the pressure chamber 86 through the solenoid-operated directional control valve 62, only when a pressure is built up in the master cylinder 64 upon depression of a brake pedal provided on the vehicle. Reference numeral 98 indicates a by-pass valve which permits the fluid pressure in the master cylinder 64 to be applied to the brake cylinder 60 without passing through the regulator 80, in the event of a failure of the pump 90 or any other trouble with the actuator 26.

Figure 6:
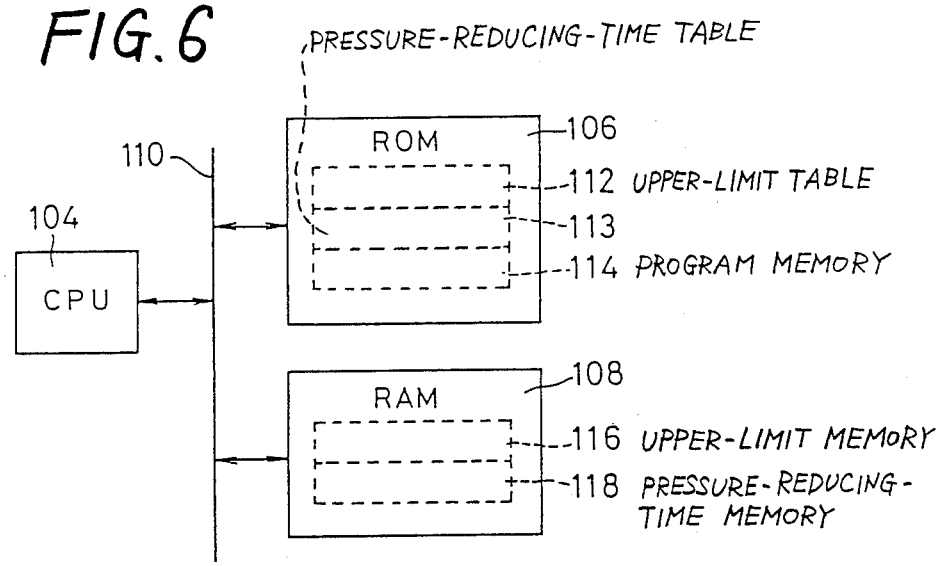
FIG. 6 is a view showing details of a computer used in the braking system of FIG. 1.
Figure 7:
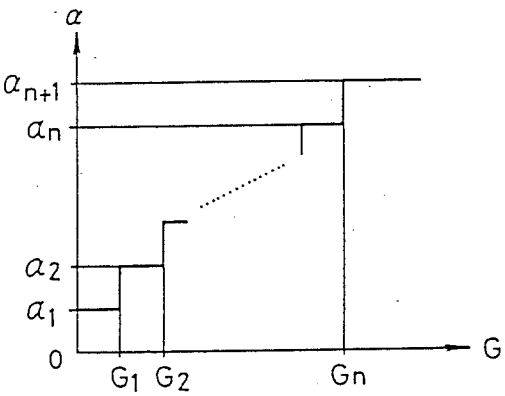
FIG. 7 is an illustration indicating a relationship between an upper limit of the vehicle deceleration and the braking pressure, which is stored in an upper-limit memory of the computer of FIG. 6.
Figure 8:
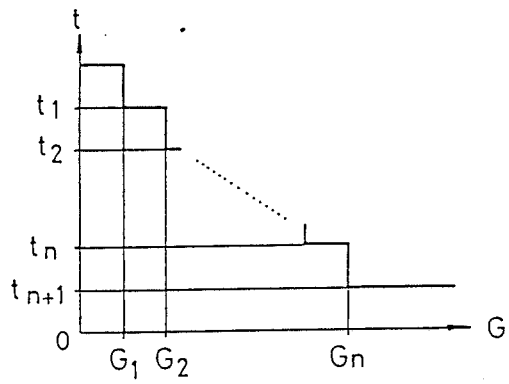
FIG. 8 is an illustration between the pressure-reducing time and the braking pressure, which is stored in a pressure-reducing-time memory of the computer of FIG. 6.

As shown in FIG. 6, the computer 34 indicated above consists of a central processing unit (CPU) 104, a read-only memory (ROM) 106, a random-access memory (RAM) 108 and a bus 110. The ROM 106 has an upper-limit table 12, a pressure-reducing-time table 113, a program memory 14, and other memories. The upper-limit table 112 stores upper limits $\alpha 1, \alpha 2, \ldots \alpha n$ of the deceleration rate of the vehicle, which correspond to detected specific deceleration rates G1, G2, Gn of the vehicle, as illustrated in FIG. 7. The pressure-reducingtime table 113 stores desired pressure-reducing times t1, t2, . . . tn during which the braking pressure in the brake 18, 20, 22, 24 is reduced, which times correspond to the detected specific rates of deceleration G1, G2, . . . Gn, as illustrated in FIG. 8. The program memory 114 stores a control program for controlling the actuators 26, 28, 30, 32, as well as a program for effecting a subroutine shown in the flow chart of FIG. 9. Since the control program for the actuators 26, 28, 30, 32 is well known, and is not essential to the understanding of the principle of the present invention, no detailed description of this control program will be provided. The RAM 108 includes an upper-limit memory 116 for storing the selected upper limit of the deceleration rate, and a pressure-reducing-time memory 118 for storing the selected pressure-reducing time.

Figure 10:
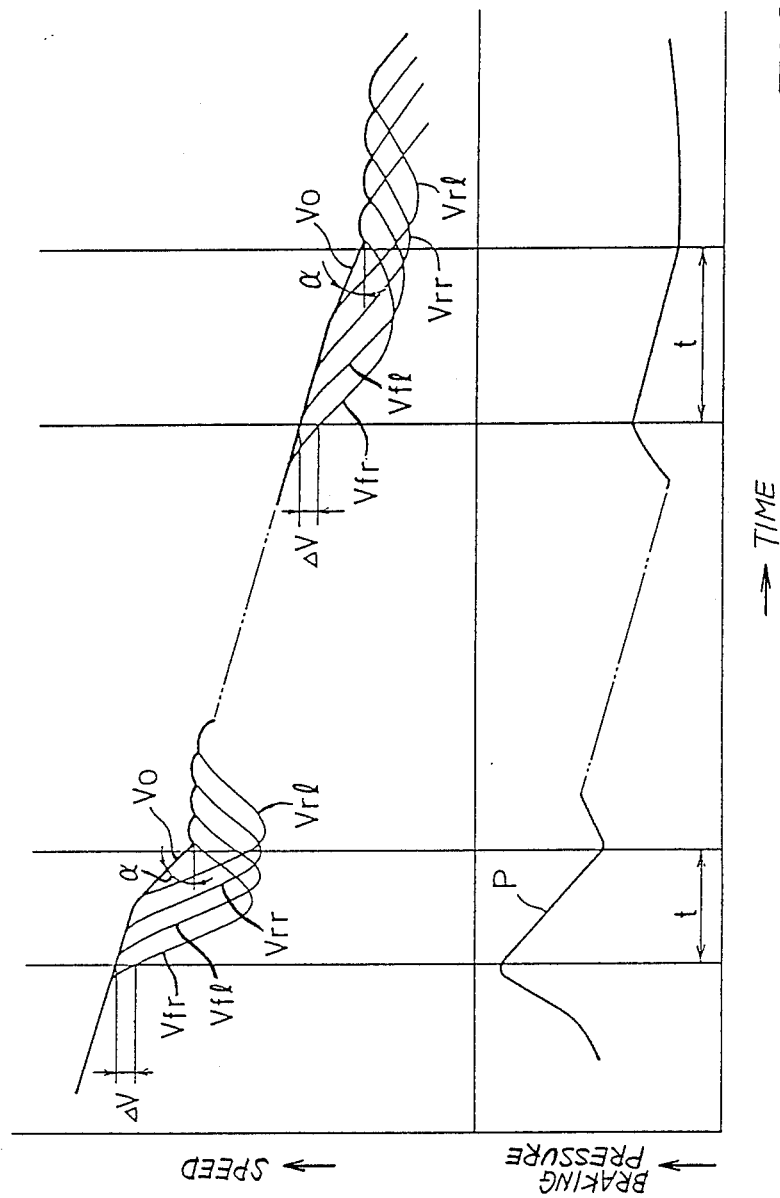
FIG. 10 is an explanatory illustration indicating a relationship among the rotating speed of each wheel of the vehicle, the presumed running speed of the vehicle and the brake cylinder pressure, in the embodiment of FIGS. 1 through 9.

Referring next to FIG. 10, an operation of the braking system constructed as described above will now be described. Reference characters used in FIG. 10 designate the following:

Vo: Pressumed running speed of the vehicle (represented by the rotating speed of a wheel)
Vfr: Rotating speed of the right-front wheel 12
Vfl: Rotating speed of the left-front wheel 10
Vrr: Rotating speed of the right-rear wheel 16
Vrl: Rotating speed of the left-rear wheel 14
α: Upper limit of the deceration rate
t: Pressure reducing time
P: Braking pressure When the fluid pressures in the brakes 18, 20, 33, 34 are raised to apply brake to the vehicle, the running speed of the vehicle is lowered while all the wheels of the vehicle are rotated at the same speed, unless the braking forces applied to the wheels are excessively large. If excessively large braking forces are applied, the rotating speeds of the wheels deviate from the running speed of the vehicle, one after another, as indicated in FIG. 10. In the present specific example of FIG. 10, the deviation occurs in the order of the speeds Vfr, Vfl, Vrr and Vrl of the respective right-front, left-front, right-rear and left-rear wheels 12, 10, 16 and 14 (in the order of description). The speed changes shown on the left side in FIG. 10 are those which occur when the deceleration rate G is comparatively high, while the speed changes shown on the right side are those which occur when the deceleration rate G is comparatively low.

As long as the two or more wheels are rotating at a same speed, the CPU 104 of the computer 34 presumes that the speed of these two or more wheel represents the actual running speed of the vehicle. The CPU 104 repeatedly compares the rotating speed of each wheel with the presumed running speed Vo of the vehicle. When the CPU 104 detects that the speed of any one of the wheels becomes lower than the presumed speed Vo by a predetermined value ΔV, the CPU 104 applies a pressure-reducing signal to the actuator 26, 28, 30, 32 which corresponds to the wheel whose speed has been excessively lowered. As a result, the braking pressure in the brake 18, 20, 22, 24 for the wheel in question is lowered, permitting the speed of the wheel to increase. As soon as the CPU 104 has generated the pressure-reducing signal, the CPU 104 starts executing the sub-routine shown in the flow chart of FIG. 9.

Figure 9:
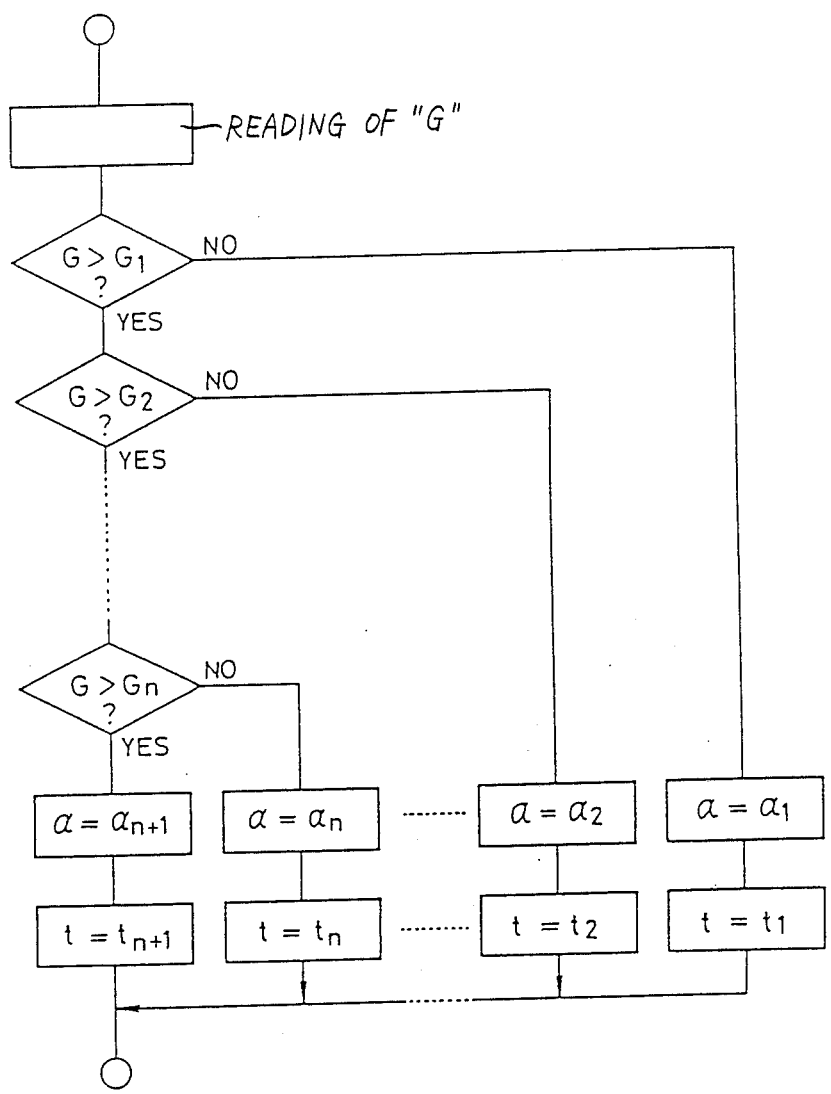
FIG. 9 is a flow chart representing a part of a control program stored in a program memory of the computer of FIG. 6, for effecting a sub-routine for determining the upper limit of the vehicle deceleration and the pressure-reducing time.

In the example of FIG. 10, the CPU 104 of the computer 34 executes the sub-routine of FIG. 9 for the first time, when the speed Vfr of the right-front wheel 12 becomes lower than the presumed speed Vo by the predetermined value ΔV. Initially, the CPU 104 reads in the deceleration rate G currently detected by the vehicle-deceleration detecting device 46, and selects or determines the upper limit α and the pressure-reducing time t, based on the relationships stored in the upper-limit table 112 and the pressure-reducing-time table 113. The determined upper limit α and the time t are stored in the upper-limit memory 116 and the pressure-reducing-time memory 118, respectively. The same steps are subsequently implemented when the speeds Vfl and Vrr of the left-front and right-rear wheels 10, 16 become lower than the presumed speed Vo by the predetermined value ΔV. The determined or selected upper limits α and the times t are also stored in the respective memories 116, 118. In this connection, it is noted that the newly determined upper limit α replaces the previously determined upper limit α already stored in the memory 116, whereby the data stored in the memory 116 is updated. On the other hand, the pressure-reducing-time memory 118 have memory sections assigned for storing the times t for the four wheels 10, 12, 14, 16.

When the rotating speed Vrr of the right-rear wheel 16 becomes lower than the rotating speed Vrl of the left-rear wheel 14 during execution of the sub-routine of FIG. 9, only the left-rear wheel 14 has the highest speed. After the moment when only one of the four wheels, i.e., left-rear wheel 14 has the highest speed, the CPU 104 repeatedly calculates the deceleration rate G of the left-rear wheel 14. When the currently calculated deceleration rate G of this wheel 14 exceeds the upper limit presently stored in the upper-limit memory 116 (i.e., the upper limit which was stored when the speed Vrr of the right-rear wheel 16 had become lower than the presumed speed Vo by the predetermined value ΔV), the CPU 104 fixes the deceleration rate at the upper limit stored in the memory 116, and repeats to presume or calculate the actual vehicle speed, based on the fixed upper limit. Therefore, the presumed running speed Vo of the vehicle is represented by a straight line which has a gradient or slope equal to the fixed upper limit α, as indicated in FIG. 10. It is assumed that the presumed vehicle speed Vo is lowered comparatively rapidly as indicated in an upper-left portion of FIG. 10, when the fixed upper limit α is relatively high, while the presumed vehicle speed Vo is lowered comparatively slowly as indicated in a lower-right portion of FIG. 10, when the fixed upper limit α is relatively low. As soon as the CPU 104 has determined to fix the deceleration rate at the above-indicated upper limit, the pressure-reducing time t for the wheel 14 is made equal to that for the right-rear wheel 16.

In the meantime, the CPU 104 of the computer 34 measures durations during which pressure-reducing signals have been applied to the actuators 26, 28, 30, 32. When the measured durations become equal to the corresponding pressure-reducing times t stored in the memory 118, the CPU 104 removes the pressure-reducing signals, and applies pressure-increasing signals to the appropriate actuators 26, 28, 30, 32. As indicated in a lower-left portion of FIG. 10, the braking pressure abruptly or rapidly drops when the braking pressure at the time of generation of a pressure-reducing signal is comparatively high. At the same time, the comparatively high braking pressure permits a comparatively high rate of deceleration of the vehicle. For this reason, the pressure-reducing time t is shortened with an increase in the braking pressure, i.e., with an increase in the detected deceleration rate G, according to the relationship shown in FIG. 8. That is, the pressure-increasing signal is generated after the braking pressure has been lowered by a suitable amount determined by the pressure-reducing time t. Conversely, if the braking pressure at the time of generation of the pressure-reducing signal is comparatively low, the signal is applied for a relatively long time t, and consequently the braking pressure can be lowered by a suitable or sufficient amount prior to the generation of the pressure-increasing signal, even though the pressure reducing rate is relatively low as indicated in a lower-right portion of FIG. 10.

Subsequently, the speed of one of the four wheels, in this example of FIG. 10, the speed Vfr of the right-front wheel 12, exceeds the presumed vehicle speed Vo, and the CPU 104 of the computer 34 presumes that the vehicle speed is represented by the speed of the right-front wheel 12. When the speed Vfl of the left-front wheel 10 subsequently exceeds the speed Vfr of the right-front wheel 12, then the speed Vfl is presumed to represent the vehicle speed Vo.

As described above, the CPU 104 repeatedly presumes the actual running speed of the vehicle, and compares the speed of each wheel with the presumed vehicle speed, in order to control the actuators 26, 28, 30, 32 so as to avoid an excessive amount of slip of the wheels 10, 12, 14, 16 on the road surface. Since the upper limit of the deceleration rate of the vehicle is determined based on the actually detected deceleration rate, the upper limit can be set close to the actual deceleration rate, and the actual vehicle speed can be presumed with accordingly improved accuracy, whereby the anti-skid braking system can be precisely controlled for efficient braking of the vehicle without locking of the wheels.

Further, the pressure-reducing times t between the application of the pressure-reducing signals to the actuators 26, 28, 30, 32, and the application of the pressure-increasing signals, are suitably determined also based on the actually detected deceleration rate of the vehicle, whereby the braking pressures in the brakes 18, 20, 22, 24 can be lowered by optimum amounts. Thus, the instant arrangement eliminates excessive or insufficient amounts of drop of the braking pressures, which result in an increased braking distance of the vehicle, or an unstable braking action due to locking or skidding of the wheels.

It follows from the foregoing description that the present embodiment incorporates a controller for controlling an anti-skid braking operation, upper-limit setting means for determining the upper limit of the deceleration rate of the vehicle, and time setting means for determining the pressure-reducing time during which the braking pressure for each wheel is lowered. The controller is constituted by the CPU 104 of the computer 34, and a portion of the program memory 114 which stores the anti-skid control program. The upper-limit setting means is constituted by the CPU 104, the upper-limit table 112, the upper-limit memory 116, and a portion of the program memory 114 which stores the sub-routine for determining the upper limit. The time setting means is constituted by the CPU 104, the pressure-reducing-time table 113, the pressure-reducing-time memory 118, and a portion of the program memory 114 which stores the sub-routine for determining the pressure-reducing time.

However, it is not essential that the pressure-reducing time is adjusted or varied depending upon the deceleration rate of the vehicle detected upon generation of a pressure-reducing signal. In a modified embodiment of the invention, the above adjustment of the pressure-reducing time is eliminated.

Figure 11:
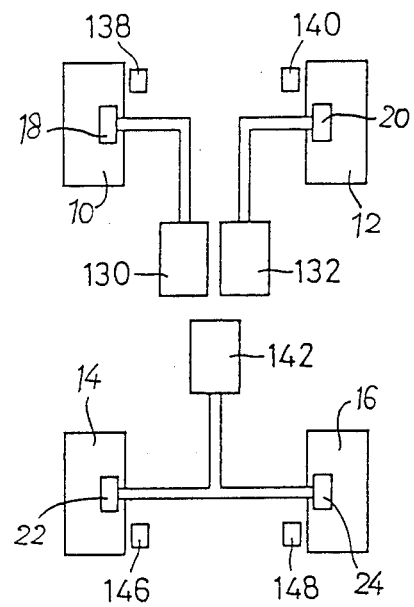
FIGS. 11 through 13 are explanatory illustrations showing arrangements of actuators and speed sensors in modified embodiments of the braking system of the invention.
Figure 12:
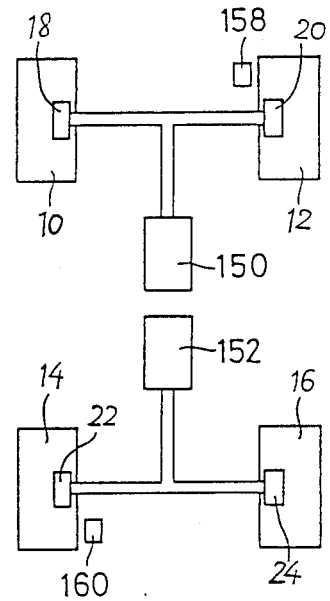
Figure 13:
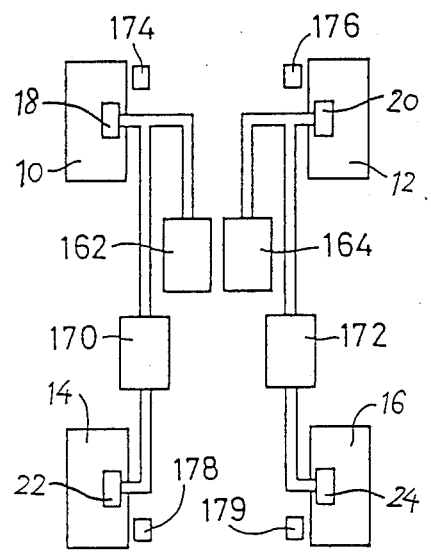

Further, the locations and number of the actuators and speed sensors may be changed as needed. FIGS. 11 through 13 show different modified arrangements of the actuators and speed sensors. In the braking system of FIG. 11, two actuators 130, 132 and two speed sensors 138, 140 are provided for the front wheels, respectively, while a single actuator 142 is commonly used for the two rear wheels. While two speed sensors 146, 148 are provided for the two rear wheels, these sensors may be replaced by a single sensor which is adapted to detect the speed of a propeller shaft of the vehicle.

In the braking system of FIG. 12, a single actuator 150, 152 is used commonly for each of the front and rear pairs of wheels. A speed sensor 158 is provided for the right-front wheel, while a speed sensor 160 is provided for the left-rear wheel. Obviously, it is possible to use the sensors 158, 160 for the left-front wheel and the right-rear wheel, or provide all of the four wheels with respective sensors.

In the arrangement of FIG. 13, two actuators 162, 164 are provided for the left-front and right-front wheels, respectively. The fluid pressures delivered by the actuators 162 and 164 are reduced by respective proportioning valves 170, 172, and the thus reduced fluid pressures are applied to the respective rear wheels. While four speed sensors 174, 176, 178, 179 are provided for the four wheels, respectively, it is possible to eliminate the speed sensors 178, 179 for the rear wheels, if the rear brakes are adapted to provide comparatively small braking forces.

The detecting device 46 for detecting the actual deceleration rate of the vehicle does not necessarily provide an electric signal which is varied continuously in response to a change in the deceleration rate (i.e., an infinitely variable electrical output). In this respect, it is possible to use a switch as the deceleration detector 46, whose output level is changed in at least two steps, depending upon whether the deceleration rate is higher or lower than a predetermined level, for example.

Figure 14:
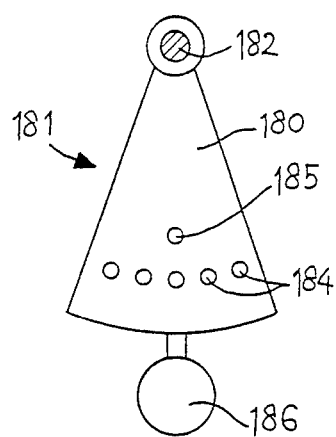
FIG. 14 is a schematic front elevational view showing a detecting head of a modified vehicle-deceleration detecting device used in another embodiment of the invention.
Figure 15:
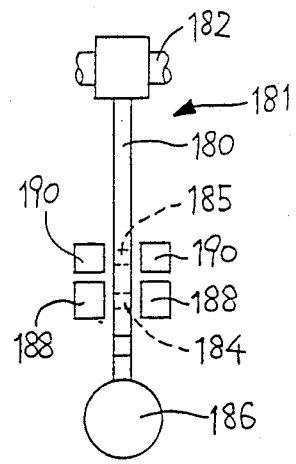
FIG. 15 is a side elevational view of the detecting head of FIG. 14, with its photoelectric sensors installed in position.

FIGS. 14 and 15 show a detecting head 181 used in a modified arrangement of the detecting device 46. The detecting head includes a pendulum in the form of a pivoting plate 180 which is pivotally supported about a shaft 182. The shaft 182 is fixed to the vehicle body, so as to extend in the transverse direction of the vehicle. The pivoting plate 180 has five apertures 184 formed through its thickness, on a circle which has a center on the axis of the shaft 182. The apertures 184 are positioned so that the central or third aperture is normally located right under the axis of the shaft 182. The pivoting plate 180 has another aperture 185 formed at a position a suitable distance spaced from the central aperture 184 in the radially inward direction of the plate. The pivoting plate 180 has a weight 186 fixed to its lower end. Upon deceleration or acceleration of the vehicle, the plate 180 is pivoted due to inertia of the plate 180 and the weight 186. A pivoting motion of the plate 180 is detected by a first photoelectric sensor 188 adapted to sense the passage of the apertures 184, and a second photoelectric sensor 190 adapted to sense the passage of the aperture 185. The aperture 185 and the second sensor 190 are provided to detect the neutral position of the pivoting plate 180.

While the detecting device 46 of FIGS. 14 and 15 uses the pendulum in the form of the pivoting plate 180, it is possible that a separate pivoting plate having the apertures 184, 185 is fixed to or coupled to a pendulum which is pivotally supported about the shaft 182, so that the pivoting plate is pivoted as the pendulum is pivoted.

Although the illustrated embodiments are adapted such that the actuators are operable in a pressure increasing mode or a pressure reducing mode, the present invention is also applicable to a braking system of a type in which the actuators has a holding mode for maintaining the braking pressures, in addition to the increasing and reducing modes. Further, it is possible that the actuators are operable in a selected one of four modes for effecting fast increase, slow increase, fast decrease and slow decrease of the braking pressures.

It will be understood that the present invention may be embodied with various other changes, modifications and improvements which may occur to those skilled in the art. For example, modifications may be made so as to provide a braking system suitable for a vehicle driven by two wheels.

What is claimed is:

1. An anti-skid braking system for an automotive vehicle comprising:
    a plurality of hydraulically operated brakes provided for a plurality of wheels of the vehicle;
    a plurality of actuators provided for a corresponding plurality of groups of brakes, each group including at least one of said plurality of brakes, each of said actuators being operable for controlling a braking pressure or pressures of said at least one brake of the corresponding group;
    a plurality of speed sensors, at least one of which is provided corresponding to each of said plurality of actuators, for detecting rotating speeds of said wheels;
    a controller comprising means for normally presuming that an actual running speed of the vehicle is represented by a highest one of the speeds of the wheels detected by said speed sensors; after a deceleration value of said highest speed has exceeded a preset upper limit, fixing the deceleration value of the vehicle at said preset upper limit, and presuming said actual running speed of the vehicle, based on said upper limit; and calculating an amount of slip of each of said wheels based on a difference between the presumed running speed of the vehicle and the detected speed of said each wheel, to control each of said actuators so as to prevent at least one of said wheels which corresponds to said each actuator, from skidding on a road surface;
    a detecting device attached to a body of the vehicle, and comprising means for detecting an actual deceleration value of said body, said detecting device generating an electric signal whose level is changed in at least two steps representative of at least two different values of said deceleration value of the body; and
    upper-limit setting means for determining said upper limit of the deceleration value of the vehicle such that said upper limit is changed with said actual deceleration value of said body detected by said detecting device, said upper limit setting means including memory means for storing said electric signal which is generated when an amount of slip of each of the wheels except the wheel which has said highest speed exceeds a predetermined value, said upper-limit setting means determining said upper limit based on the electric signal stored in said memory means.

2. An anti-skid braking system according to claim 1, further comprising time setting means for determining a pressure-reducing time during which said controller keeps applying a pressure-reducing signal to said each actuator, such that said pressure-reducing time is shortened as said actual deceleration value of said body detected by said detecting device is increased.

3. An anti-skid braking system according to claim 2, wherein said time setting means includes a pressure-reducing-time table for storing a relationship in which a plurality of time values of said pressure-reducing time correspond to a plurality of successive ranges of said actual deceleration value detected by said detecting device, said time setting means retrieving from said pressure-reducing-time table one of said plurality of time values which corresponds to one of said successive ranges in which said actual deceleration rate detected by said detecting device falls.

4. An anti-skid braking system according to claims 1, wherein said detecting device includes a detecting head which comprises:
    a base fixed to the body of the vehicle;
    a planar member secured at one end thereof to said base such that a free end portion of said planar member protrudes from said base, and such that major opposite surfaces of said planar member face in opposite front and rear directions of the vehicle;
    a weight secured to said free end portion of said planar member; and
    detecting means for detecting an elastic strain of said planar member which occurs due to an inertia of said weight upon deceleration of the vehicle.

5. An anti-skid braking system according to claim 4, wherein said planar member consists of a silicon wafer, and said detecting means consists of a diffusion resistor formed on a surface of said silicon wafer.

6. An anti-skid braking system according to claims 1, wherein said detecting device includes a detecting head which comprises a pendulum pivotally supported about an axis extending in a transverse direction of the vehicle, and detecting means for detecting an amount of a pivoting motion of said pendulum due to an inertia of said pendulum upon deceleration of the vehicle.

7. An anti-skid braking system according to claim 6, wherein said detecting means includes a pivoting plate which is pivoted with said pendulum, said pivoting plate having a plurality of apertures formed through a thickness thereof, on a circle having a center on an axis of pivot thereof, said detecting means further including a photoelectric sensor adapted to detect passage of said apertures.

8. An anti-skid braking system according to claims 1, wherein said upper-limit setting means includes an upper-limit table for storing a relationship in which a plurality of upper-limit values of said upper limit correspond to a plurality of successive ranges of said actual deceleration value detected by said detecting device, said upper-limit setting means retrieving from said upper-limit table one of said plurality of upper-limit values which corresponds to one of said successive ranges in which said actual deceleration value detected by said detecting device falls.

9. An anti-skid braking system according to claims 1, wherein said vehicle is a four-wheel drive vehicle having four wheels all of which are driven by an engine.

* * * * *